J. PATTISON.
Ore Amalgamator.
No. 82,745.  Patented Oct. 6, 1868.
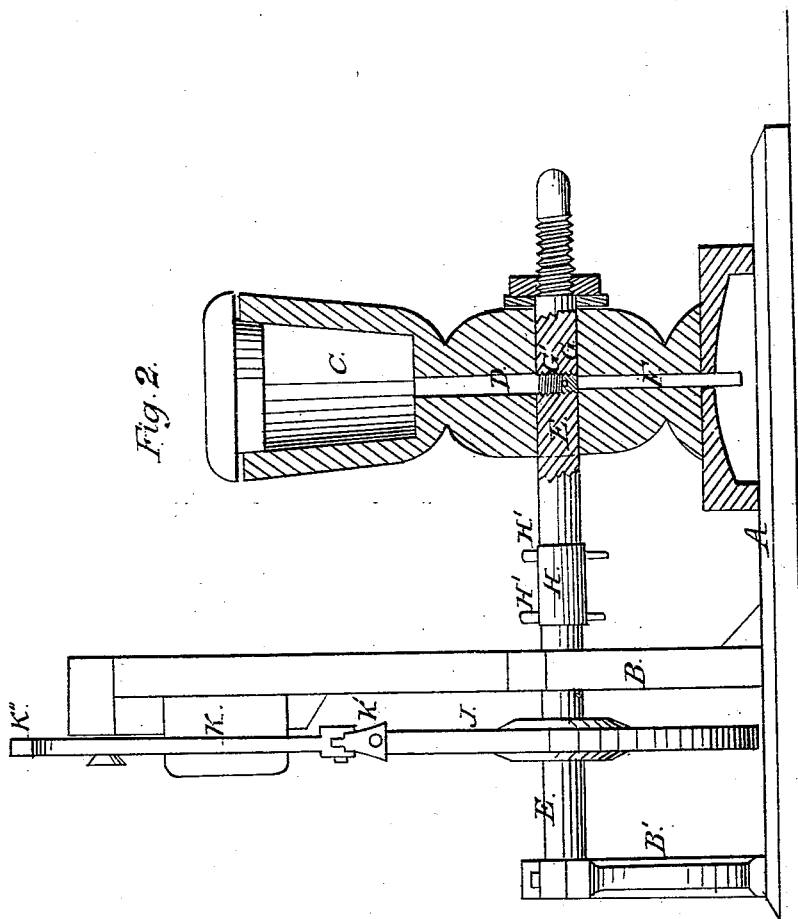
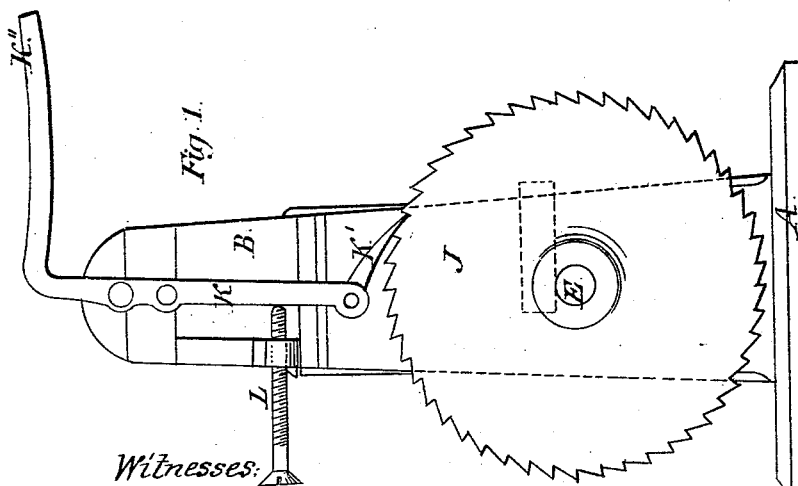
Witnesses:
J. L. Boone
Geo. H. Strong
Inventor:
John Pattison
by Dewey & Co
attys.

United States Patent Office.

JOHN PATTISON, OF NEVADA, CALIFORNIA.

Letters Patent No. 82,745, dated October 6, 1868.

IMPROVED QUICKSILVER-FEEDER FOR QUARTZ-MILLS.

*The Schedule referred to in these Letters Patent and making part of the same.*

TO ALL WHOM IT MAY CONCERN:

Be it known that I, JOHN PATTISON, of the city and county of Nevada, State of California, have invented an Improved Quicksilver-Feeder for Quartz-Mills; and I do hereby declare the following description and accompanying drawings are sufficient to enable any person skilled in the art or science to which it most nearly appertains to make and use my said invention or improvements without further invention or experiment.

The nature of my invention is to provide a machine for feeding quicksilver to quartz-batteries, which is operated by any simple device, which may be readily connected with the curved shaft. Great difficulty is usually experienced in feeding quicksilver to the battery, by hand, with the proper degree of regularity to obtain the desired benefit therefrom. The feeder is apt to be neglectful, or he feeds too much at a time. Loss is the result in either case.

My invention consists of a suitable frame, placed at the desired height above the mill, so that the quicksilver will fall by its own gravity into the battery. Upon the frame is placed a fountain, of suitable size, below which passes a horizontal shaft, having a hole partially through it, in which is placed a set-screw, which partially fills the opening, the remainder forming a cup. A hole is made through the bottom of the fountain, extending down to the cup. A pipe extends from below the horizontal shaft, through the base of the fountain. The shaft divides the opening, and in its revolutions, the cup receives its charge of quicksilver from the fountain, and discharges it into the lower pipe or opening.

The shaft is divided, and is coupled together by a slotted ring, held by two keys or pins, so that it may be disconnected from the cup-shaft. This part of the shaft has its bearings in two upright posts, between which is a toothed wheel, which is operated by a pawl or dog, attached to the end of a vertical rod, having a curved arm bent at right angles. A set-screw regulates the length of the stroke of the bar.

To more fully illustrate and describe my invention, reference is had to the accompanying drawings, and letters marked thereon, of which—

Figure 1 is an end view.

Figure 2 is a side sectional elevation.

A A represent a suitable frame or foundation upon which to place my machine, and may be placed at any convenient spot near the batteries, and elevated so that the quicksilver may fall by its own gravity.

B B are two upright posts, which furnish bearings for the shaft, and the necessary place for the attachment of the machinery.

C is the quicksilver-fountain, raised a little above the floor of the frame, and has a vertical opening through it, in which is placed a pipe, D, which fits closely against the horizontal shaft E below it.

The shaft E passes through the fountain horizontally, and below it is a vertical pipe, F, which leads to the battery. This pipe also presses close against the shaft.

In a direct line with the hole in the pipe is made an opening in the horizontal shaft, in which is placed a set-screw, G, filling about one-half of the diameter of the hole, the remainder forming a cup, G′, to receive the quicksilver as it falls from the fountain as the shaft revolves, and discharges it into the pipe below at each half revolution, and from thence it falls into the battery.

The shaft is divided, and is coupled together by a slotted ring, H, and keys H′ H′, and has two bearings in the posts B B′, between which rotates a toothed wheel, J. The wheel is operated by a cam-lever, K, having a pawl, K′, at the end, which engages the teeth on the wheel, and by lengthening or shortening the stroke by a set-screw, L, the horizontal shaft is made to revolve faster or slower, and empty the cup at each revolution, the charge being regulated by the set-screw. The power to drive the machine may be taken from the cam-shaft of the mill, by a cam operating upon the curved arm K″ of the lever K.

By this device, any given amount of quicksilver can be dropped into the battery at regular intervals, according to the speed with which the battery is being run. The feed can be varied, to suit the character of the rock being worked, to the smallest desirable amount.

The device is cheap, occupies but small space, and can be set, if desirable, entirely above the stamps, so as to be out of the way. All that the amalgamator has to do is to fill his reservoir, and the amount of feed to the battery cannot vary or fail until the reservoir is empty. The instant the mill stops, the supply of quicksilver is cut off, and put on again the instant the mill is started.

Having thus described my invention, what I claim, and desire to secure by Letters Patent, is—

1. The quicksilver-fountain C, with the vertical pipes D and F, above and below the horizontal shaft, substantially as described.

2. The cup G', in the horizontal shaft E, graduated by the set-screw G, or their equivalents, substantially as and for the purpose described.

3. Coupling the shaft E together by the slotted ring H and keys H' H', and operating the machine by the lever K, pawl K', and toothed wheel J, the whole constructed and arranged to operate substantially as described.

In witness whereof, I have hereunto set my hand and seal.

JNO. PATTISON. [L. S.]

Witnesses:
    J. L. BOONE,
    GEO. H. STRONG.